Patented Jan. 20, 1942

2,270,508

UNITED STATES PATENT OFFICE 2,270,508

COATING COMPOSITION

Roy E. Coleman, Meriden, Conn., assignor, by mesne assignments, to Time, Incorporated, a corporation of New York No Drawing. Application August 12, 1937, Serial No. 158,736

5 Claims. (Cl. 106—153)

This invention relates to liquid coating compositions made from zein or the other prolamins which form white, opaque, flexible films on drying, and to paper coated with the same. The invention set forth herein is related to the inventions described in my copending applications, Serial Nos. 158,210, now Patent No. 2,185,123, patented December 26, 1939; 158,214 and 158,215, now Patent No. 2,185,124, patented December 26, 1939, filed August 9, 1937.

In the following description of my invention I will refer to the preparation of substantially non-aqueous coating compositions made from zein derived from corn, but it is of course to be understood that my invention is also applicable to the preparation of coating compositions made from the other prolamins such as, for example, gliadin from wheat, hordein from barley, kafirin from kafir and the prolamins from other cereal gains. The above-mentioned prolamins are at present derived by extraction with an aqueous alcohol solution in which the added water varies generally from about 15 to 40% of the solvent mixture. The material utilized in accordance with my invention is the dried extract which may be completely dry or the commercial product which contains a small percentage of moisture.

In accordance with my present invention, I have found that, stable, substantially non-aqueous coating compositions may be made from zein and the low-molecular weight alcohols such as ethyl alcohol and the like by the aid of stabilizing and opacifying agents which have the ability of preventing separation of the zein from the alcohol solvent at relatively low temperatures, and of causing a coated film, on drying, to turn milky white, opaque, while keeping it flexible and tough. The stabilizing and opacifying agents referred to herein, as will appear from the description thereof, are neither pigments nor lakes, but are alcohol soluble liquids (under which term is included alcohol miscible liquids) and become constituents of a zein solution which is usually clear, but forms a modified zein film on drying which is opaque or approaches being opaque. The zein may be present in these coating compositions in widely varying concentrations, for example, from about 1 part by weight of zein to about 2 to about 20 or more parts by weight of the solvent mixture. The coating compositions embodying my invention are stable on standing at temperatures of 80° F. and below and even at temperatures of 60 to 70° F. and somewhat below. These stabilized coating compositions, when cooled to temperatures as low as 10° F. or as low as 0° F. may separate or become solid; however, on heating again to temperatures of from about 40 to 70° F., a re-solution is effected either without, or with slight stirring and the coating compositions return to their normal stabilized form at these reheating temperatures. The stable coating compositions produced in accordance with the present invention are substantially non-aqueous in that they may contain 5% or less of water based on anhydrous ethyl alcohol. The inclusion of larger percentages of water is not precluded although I prefer that my coating compositions contain not more than 5% of added water.

The stabilizing and opacifying agents used in accordance with my invention may or may not in and of themselves be solvents for zein but serve to stabilize solutions of zein in alcohol and particularly in alcohol containing 5% or less of added water based on anhydrous ethyl alcohol. As examples of stabilizing and opacifying agents embodying my invention, mention may be made of glycerin, dichlorethyl ether, cyclohexanol, the esters such as dimethyl phthalate, diethyl phthalate, tri-cresyl phosphate, tri-phenyl phosphate, diethyl sulphate and the like, or any suitable mixture thereof.

The proportion of low-molecular weight alcohol, for example, 95% or 96% alcohol, employed in carrying out my invention may vary from about 1 to about 20 or more and preferably 2 to 9 or more parts by weight of the alcohol to 1 part by weight of the zein. In most instances 2 to 5 parts by weight of the alcohol to 1 part by weight of the zein have been found sufficient to aid in effecting the desired stable zein coating compositions. The most practical working concentrations of zein in alcohol have been found to be in the order of 4 or 5 parts by weight of the alcohol to 1 part by weight of the zein.

The proportion of stabilizing and opacifying agent or agents employed in carrying out my invention may vary from about 2 to about 25% of the alcohol and even up to 45% and higher. In most instances 10 to 15% of the stabilizing and opacifying agents in respect of the alcohol has been found sufficient to effect the desired stable coating compositions made from zein and alcohol in the concentrations stated. I have found that the proportion of stabilizing and opacifying agents required is influenced to a great extent by the concentration of the zein in the alcohol and, in general, he has found that as the concentration of zein in alcohol decreases, the amount of stabilizing agent or agents required increases and vice versa.

In preparing the coating composition embodying my invention, the stabilizing and opacifying agents may first be mixed with the alcohol and the mixture then mixed with the zein in a suitable vessel to form the stable coating composition; or, if desired, the stabilizing agent may be added to the zein along with the alcohol. In either event, stable zein coating compositions are obtained on mixing the zein and the solvents at temperatures of about 80° F. or with slight heating, say up to about 100 to 125° F. or higher. The stable coating compositions so formed may, if desired, be diluted with any conventional diluent such as, for example, the lacquer diluents and thinners which are compatible with alcohol, the stabilizing agent utilized in effecting stabilization, and the alcohol-zein solution. It is of course obvious that other materials such as preservatives and the like may be incorporated in the coating compositions embodying my invention.

In use, the coating compositions embodying my invention may be applied to any surface or material such as, for example, any suitable surface or wall, paper, Cellophane, cloth, glass, wood and the like as by coating, dipping or spraying or by any other suitable coating process. The coatings dry in a relatively short time, in the order of about 2 to 60 minutes at room temperature, to form a white, opaque, flexible, tough and strongly adherent film. The drying time is of course influenced by the characteristics of the solvents utilized to effect solution of the zein, by the thickness of the film, the temperature and humidity of the surrounding drying medium and the like. These films impart water and oil resistance to paper, Cellophane and the like and provide an excellent printing surface. Paper, Cellophane and the like, when coated with these films, exhibits substantially all of the visual characteristics of being coated with intensely white pigments such as titanium oxide and the like. These coated papers materially resist curling or crinkling when in contact with water.

The following examples are illustrative of the coating compositions and coated fabrics embodying my invention and it is to be understood that other coating compositions in other proportions and other coated articles are to be included within the purview of my invention all as hereinbefore set forth. In the examples, the term "parts" indicates parts by weight.

Example 1

10 parts of zein are mixed with 40 parts of 95% alcohol and 4 parts of dichlorethyl ether. On stirring and with the application of heat in the order of about 75 to 85° F. a stable zein coating composition is obtained in about 5 to 10 minutes. On coating a sheet of paper with this composition, the coating dries in about 3 to 4 minutes to a very white opaque, strongly adherent film which is both hard and flexible and has a very high sheen. The zein film renders the paper moisture and oil resistant and provides an excellent printing surface.

Example 2

10 parts of zein are mixed with 50 parts of 95% alcohol and 5 parts of glycerin. On stirring and with the application of heat in the order of about 80 to 90° F. a stable zein coating composition is obtained in about 4 to 8 minutes. On coating a sheet of Cellophane with this composition, the coating dries in about 5 to 10 minutes to a white, opaque, strongly adherent film which is hard, flexible and tough and has a high sheen. The film renders the Cellophane moisture and oil resistant and provides an excellent printing surface.

Example 3

10 parts of zein are mixed with 40 parts of 95% alcohol and 4.8 parts of cyclohexanol. On stirring and with the application of zein in the order of about 100 to 110° F. a stable zein coating composition is obtained in about 6 to 10 minutes. On coating a sheet of glass with this composition, the coating dries in about 3 to 5 minutes to a white, opaque, strongly adherent film which is hard, flexible and tough. The film imparts to the glass an appearance which simulates frosting.

The characteristics of the coating compositions and hence of the ultimate films can be altered at will and as desired by the inclusion in the coating composition of diluents, modifiers or plasticizers, filler and the like as set forth in my copending application (Case No. 7), Serial No. 158,215, now Patent No. 2,185,124, patented December 26, 1939, filed August 9, 1937. If desired, dyes may be included with the coating compositions to form colored zein films.

In the claims when I use the expression "substantially non-aqueous" I refer to coating compositions made from zein or the other prolamins wherein the added water is preferably 5% or less. When I use the expression "stable" I mean coating compositions which do not separate on standing or even when cooled to temperatures of 50 to 70° F. and somewhat below.

I claim:

1. A substantially non-aqueous, stable, liquid zein coating composition which is stable against separation of the zein at temperatures of 70° F., comprising about 1 part by weight of zein and at least about 2 parts by weight of a solvent mixture for the zein containing not in excess of 5% of water comprising alcohol and glycerine, said glycerine being capable of modifying the zein in solution on drying in film form to produce a hard, white, opaque, flexible and tough, modified zein film, the total water content of said composition, excluding the moisture in the zein, being not in excess of about 5%.

2. The composition set forth in claim 1 wherein a major portion of said solvent mixture is 95% alcohol and a minor portion thereof is glycerine.

3. A substantially non-aqueous, stable, liquid zein coating composition which is stable against separation of the zein at temperatures of 70° F., comprising about 1 part by weight of zein and at least about 2 parts by weight of a solvent mixture for the zein containing not in excess of 5% of water comprising alcohol and an ester, said ester being capable of modifying the zein in solution on drying in film form to produce a hard, white, opaque, flexible and tough, modified zein film, the total water content of said composition, excluding the moisture in the zein, being not in excess of about 5%.

4. A substantially non-aqueous, stable, liquid zein coating composition which is stable against separation of the zein at temperatures of 70° F., comprising about 1 part by weight of zein and at least about 2 parts by weight of a solvent mixture for the zein containing not in excess of 5% of water comprising alcohol and tri-cresyl phosphate, said phosphate being capable of modifying the zein in solution on drying in film form to produce a hard, white, opaque, flexible and tough, modified zein film, the total water content of said composition, excluding the moisture in the zein, being not in excess of about 5%.

5. A substantially non-aqueous, stable, liquid zein coating composition which is stable against separation of the zein at temperatures of 70° F., comprising about one part by weight of zein and at least about two parts by weight of a solvent mixture for the zein containing not in excess of 5% of water, said solvent mixture comprising alcohol and an alcohol-soluble, liquid, oxygenated organic compound having a boiling point above ethyl alcohol and being capable of modifying the zein on drying in film form to produce a hard, white, opaque, flexible and tough, modified zein film, the total water content of said composition, excluding the moisture in the zein, being not in excess of about 5%.

ROY E. COLEMAN.